(12) United States Patent
DuBois

(10) Patent No.: US 7,237,813 B2
(45) Date of Patent: Jul. 3, 2007

(54) BOX LIFTING DEVICE

(76) Inventor: Dennis DuBois, 2375 E. Tropicana Ave. #271, Las Vegas, NV (US) 89119

( * ) Notice: Subject to any disclaimer, the term of this patent is extended or adjusted under 35 U.S.C. 154(b) by 0 days.

(21) Appl. No.: 11/201,561

(22) Filed: Aug. 10, 2005

(65) Prior Publication Data

US 2007/0035139 A1 Feb. 15, 2007

(51) Int. Cl.
*B65G 7/12* (2006.01)
(52) U.S. Cl. .................. 294/15; 294/27.1; 16/422
(58) Field of Classification Search .............. 294/8.6, 294/15, 61, 25, 27.1; 229/117.19; 16/422, 16/425
See application file for complete search history.

(56) References Cited

U.S. PATENT DOCUMENTS

| | | | | |
|---|---|---|---|---|
| 430,399 A | * | 6/1890 | O'Dell | 294/8.6 |
| 3,498,661 A | * | 3/1970 | Graziano | 294/8.6 |
| 4,226,349 A | * | 10/1980 | Uccellini | 294/164 |
| 4,682,803 A | * | 7/1987 | Andrews | 452/196 |
| 4,707,011 A | * | 11/1987 | McKim, Jr. | 294/16 |
| 5,364,143 A | * | 11/1994 | Grady | 294/8.6 |
| 6,217,091 B1 | * | 4/2001 | Whitney | 294/15 |
| 6,422,620 B1 | * | 7/2002 | Jordening | 294/15 |

* cited by examiner

*Primary Examiner*—Dean J. Kramer
(74) *Attorney, Agent, or Firm*—Rob L. Phillips; Greenberg Traurig

(57) ABSTRACT

A pair of devices for lifting boxes is disclosed. Each device comprises a handle, lifting surface, lifting plate and a plurality of lifting members in the form of angled teeth. During use, the teeth of each device are inserted into opposite sides of a corrugated box. A user is then able to lift the box using the temporary handles. The teeth are sized to avoid damage to the contents of the box. The teeth may be punched into a removable metallic lifting plate. The design of the teeth provides a sufficient amount of surface area for maintaining the box. During non-use the lifting plate may be removed and re-attached in an opposite orientation to prevent injuries which may be caused by the teeth.

14 Claims, 3 Drawing Sheets

BOX LIFTING DEVICE

FIELD OF THE INVENTION

The embodiments of the present invention relate to a device for lifting corrugated boxes. More particularly, the embodiments relate to a pair of hand held units which partially insert into a box and act as lifting handles.

BACKGROUND

Lifting boxes has long been a tedious and unpleasant endeavor. In particular, large boxes can be cumbersome and difficult to grip and lift. Accordingly, lifting boxes in an improper manner may cause severe back injuries. While there have been attempts to develop means and devices for improving the ease with which one can lift boxes, each of the attempts has suffered drawbacks.

For example, corrugated boxes have incorporated perforated sections which, when necessary, are punched out to act as handles. Unfortunately, the handles tend to fail and can injury unprotected hands. Dollies and straps are also popular in the moving business. However, not everyone has a dolly available. Moreover, dollies can damage flooring and similar surfaces.

Thus, there continues to be the need for a simple device for lifting boxes.

SUMMARY

Accordingly, a first embodiment of the present invention comprises a pair of identical hand-held units each comprising a circular handle connected to a lifting surface. An underside of the lifting surface includes a series of lifting members designed to puncture a corrugated box. In practice, a user first inserts the lifting members into sides of the corrugated box. Then, the user is able to grip the handles and lift the box. Angling the lifting members in an upward direction maintains the box in position during the lifting procedure. Once the box is moved, the lifting members are easily removed. The lifting members are sized to prevent any damage to the contents of the box being lifted.

In a first embodiment, the lifting members are metallic teeth formed in a lifting plate. Points of the teeth are angled upward so that the box does not disengage while it is being lifted. During non-use the lifting plate may be removed, turned over and re-attached to the lifting surface such that the teeth are contained within a cavity in the lifting surface. In this manner, accidental injury is avoided during non-use.

Other features, variations and embodiments will become evident from the detailed description, drawings and claims set forth below.

DETAILED DESCRIPTION

Figure 1:
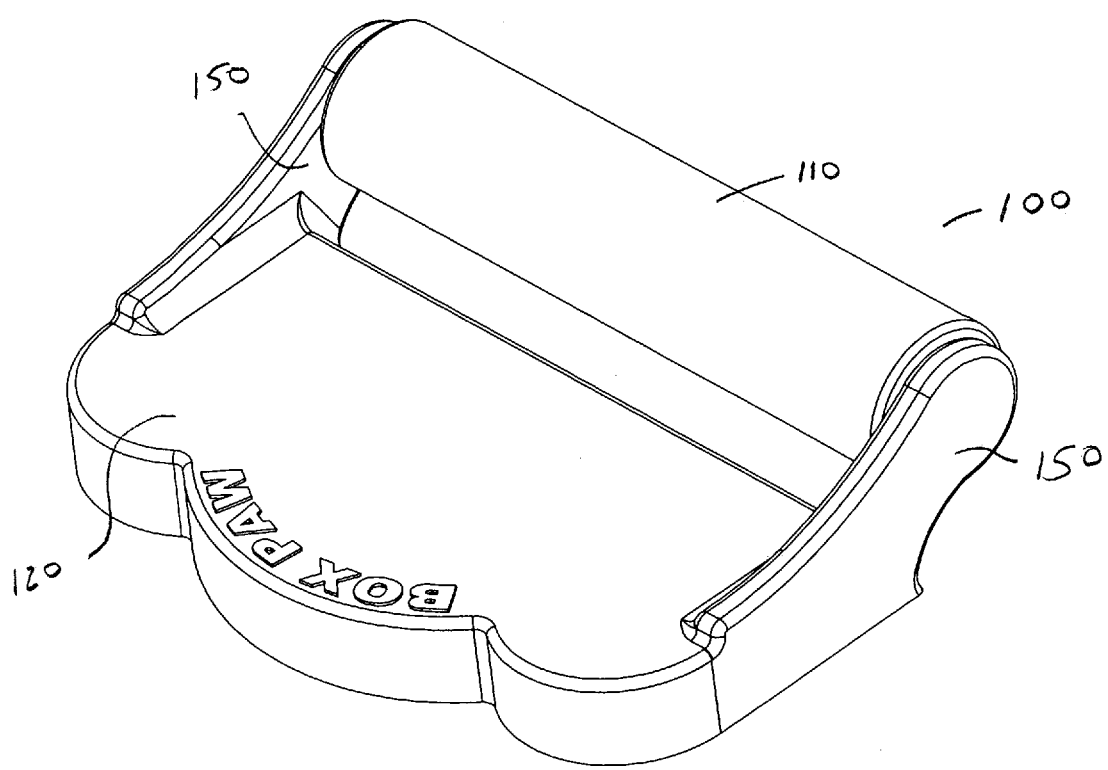
FIG. 1 shows a perspective view of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Figure 2:
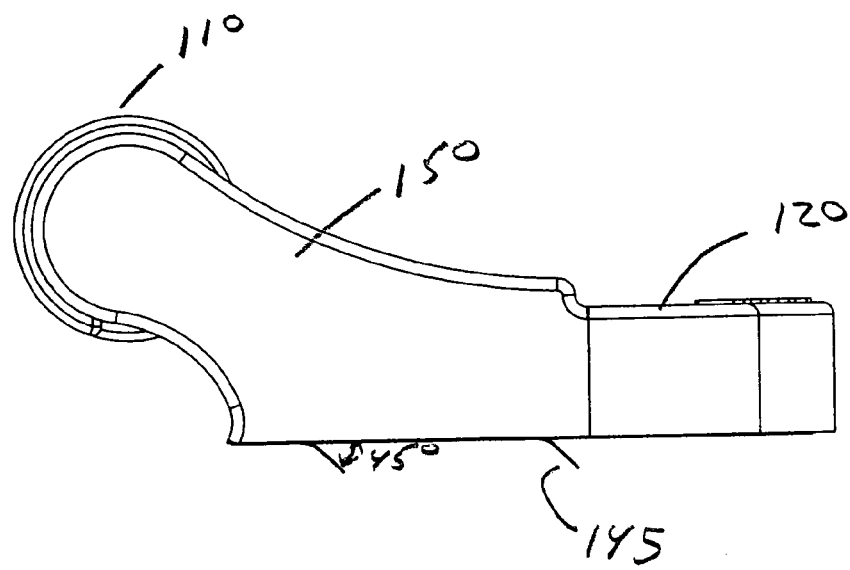
FIG. 2 shows an end view of the present invention.
Figure 3:
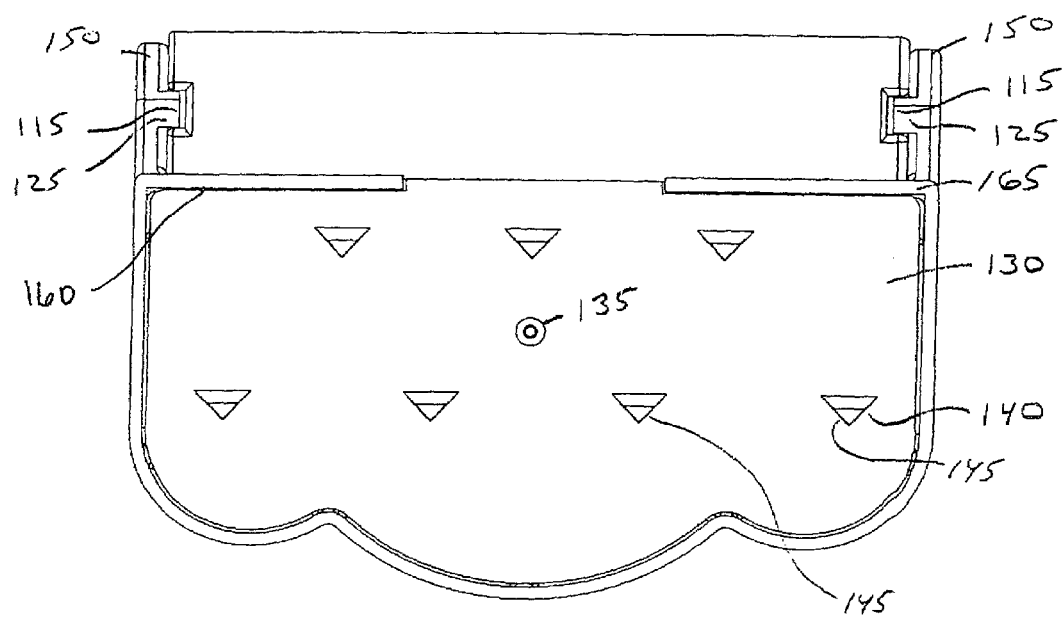
FIG. 3 shows an underside of the present invention.

Reference is now made to the figures wherein like parts are referred to by like numerals throughout. FIGS. 1–3 illustrate a device 100 of a first embodiment of the present invention for lifting boxes. The invention is ideal for lifting corrugated boxes. Corrugated boxes are named for the fluted inner layer called corrugated medium that is sandwiched between layers of linerboard. Corrugated boxes are used extensively in the United States because they are impact, drop and vibration damage resistant while remaining light enough to ship products.

The device 100 comprises a handle 110, lifting surface 120, lifting plate 130 and lifting members 140. Preferably, the handle 110 and lifting surface 120 are fabricated of plastic using injection molding techniques. The handle 110 is joined to the lifting surface 120 by a pair of support members 150.

The handle 110 and lifting surface 120 may be a single unit or the handle 110 may be separate such that it is removable. A removable handle facilitates a simpler manufacturing process. In a removable fashion, the handle 110 includes notches 115 on each end thereof. The notches 115 engage protrusions 125 on inner surfaces of the support members 150. The notches 115 are designed such that the handle 110 may be attached to the support members 150 by twisting the handle 110 into place. Whether the handle 110 is integral or a separate unit, the handle 110 may be coated with a resilient surface (e.g., sponge) to accommodate a user's hands.

In practice, a user inserts the lifting members 140 of a pair of devices 100 into opposite sides of a corrugated box. The user then grips the handles 110 such that the user's thumbs are placed against the handles 110 in a parallel fashion along a top of the handles 110 and the user's fingers are curled up against a bottom portion of the handles 110. Then, the user simply applies upward pressure which secures the lifting members within the inner fluted layer of the corrugated box such that the box may be lifted.

Figure 4:
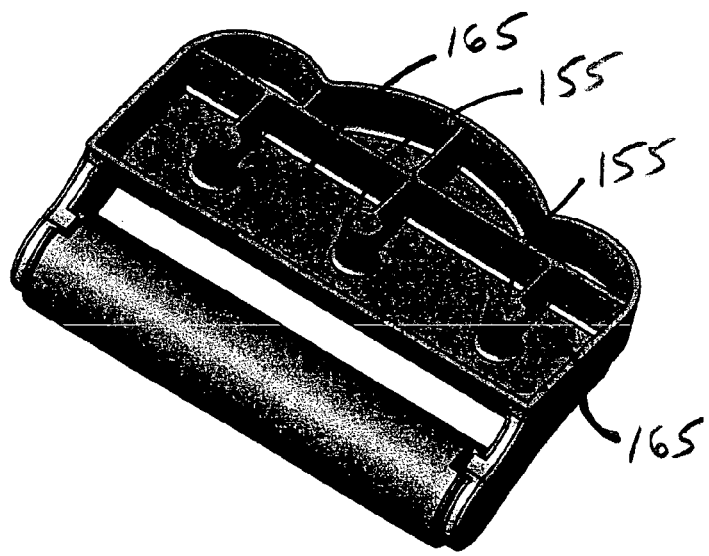
FIG. 4 shows an underside of the present invention with a lifting plate removed.

Ideally, the lifting plate 130 is fabricated of a metallic member. In one embodiment, the lifting plate 130 is stamped in a machine press whereby the lifting members 140 in the form of teeth 145 are punched out of the metallic member forming the lifting plate 130. A shown in FIG. 3, the lifting plate 130 also incorporates multiple apertures 135 for the insertion of removable fasteners (e.g., screws). The position of the apertures 135 correspond to fastener inlets 155 integrated on an underside of the lifting surface 120. To demonstrate that multiple configurations are possible, FIG. 3 shows a single aperture 135 in the lifting plate 130 while FIG. 4 shows three inlets 155. Accordingly, the plate 130 shown in FIG. 3 is not the appropriate lifting plate 130 for the lifting device 100 shown in FIG. 4. In the proper arrangement, during non-use, the lifting plate 130 may be removed and re-attached in an opposite orientation such that the teeth 145 are contained within a cavity 165 defined by an underside of the lifting surface 120. Therefore, accidental injuries which might be caused by the teeth 145 are eliminated.

In an alternative embodiment, a bottom edge 160 the lifting plate 130 rests in a channel (not shown) on a bottom edge 165 of the lifting surface 120 and is then removably attached with a single centrally positioned fastener (e.g., screw) as shown in FIG. 3.

Although the teeth 145 may be angled differently, the inventor has found that a 45° angle between the teeth 145 and lifting plate 130 is ideal for maintaining the box during the lifting process. The upward angle provides increased surface area for contact with the box. In this configuration, the large surface area of the plurality of teeth 145 contacts the box and accommodates the weight of the box and contents. The increased surface area prevents the teeth from 145 from ripping through the box during use.

Although the invention has been described in detail with reference to several embodiments, additional variations and modifications exist within the scope and spirit of the invention as described and defined in the following claims.

I claim:

1. A device for lifting a box comprising:
   a lifting surface;
   a handle connected to said lifting surface with a pair of spaced support arms wherein the handle is removable from the lifting surface and comprises notches at each end, said notches for engaging protrusions on the spaced support arms, said support arms extending from said lifting surface; and
   a lifting plate removably connected to the lifting surface, said lifting plate including a plurality of angled lifting members extending therefrom.

2. The device of claim 1 wherein the lifting members are angled at forty-five degrees with the lifting plate.

3. The device of claim 1 wherein the lifting plate may be removed and re-attached in an opposite orientation such that the lifting members are contained within a cavity of the lifting surface.

4. The device of claim 1 wherein the lifting surface includes a channel at a bottom edge thereof, said channel for accepting a bottom edge of the lifting plate.

5. The device of claim 1 wherein the lifting plate is metallic.

6. The device of claim 1 wherein the lifting members comprise teeth punched into the lifting plate.

7. A device for lifting a box comprising:
   a lifting surface;
   a handle connected to said lifting surface with a pair of spaced support arms extending from said lifting surface, wherein the handle is removable from the support arms by means of notches at each end of the handle, said notches for engaging protrusions on the spaced support arms; and
   a lifting plate removably connected to the lifting surface, said lifting plate including a plurality of angled lifting members extending therefrom.

8. A device for lifting a box comprising:
   a lifting surface connected to a handle via a pair of oppositely positioned, rigid support members, said handle extending between and removably connected at each end thereof to said oppositely positioned, rigid support members, and comprising notches at each end, said notches for engaging protrusions on spaced support arms, said support arms extending from said lifting surface;
   a lifting plate removably connected to an underside of the lifting surface; and
   a plurality of angled teeth extending from said lifting plate.

9. The device of claim 8 wherein a space exists between the lifting surface and the handle.

10. The device of claim 8 wherein the lifting plate is fabricated of a metallic material.

11. The device of claim 10 wherein the lifting plate is stamped by a machine press.

12. The device of claim 10 wherein the teeth are punched into the lifting plate.

13. The device of claim 8 wherein the lifting plate may be removed and re-attached in an opposite orientation to the lifting surface such that the teeth are contained within a cavity in an underside of the lifting surface.

14. The device of claim 8 wherein a bottom edge of the lifting plate resides in a channel at the bottom edge of the lifting surface.

* * * * *